United States Patent
Mueller

(10) Patent No.: US 11,815,200 B2
(45) Date of Patent: *Nov. 14, 2023

(54) APPARATUS FOR CONNECTION AND SEALING OF UTILITY CONNECTIONS

(71) Applicant: Peter Baruch Mueller, Berkeley, CA (US)

(72) Inventor: Peter Baruch Mueller, Berkeley, CA (US)

(73) Assignee: Peter Baruch Mueller, Berkeley, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 17/141,230

(22) Filed: Jan. 5, 2021

(65) Prior Publication Data

US 2021/0123548 A1  Apr. 29, 2021

Related U.S. Application Data

(63) Continuation of application No. 15/994,545, filed on May 31, 2018, now Pat. No. 10,883,631.

(60) Provisional application No. 62/513,678, filed on Jun. 1, 2017.

(51) Int. Cl.
| | | |
|---|---|---|
| *F16L 15/00* | (2006.01) | |
| *F16L 21/00* | (2006.01) | |
| *F16L 21/035* | (2006.01) | |
| *F16L 21/08* | (2006.01) | |
| *F16L 25/12* | (2006.01) | |

(52) U.S. Cl.
CPC ............ *F16L 15/00* (2013.01); *F16L 21/002* (2013.01); *F16L 21/035* (2013.01); *F16L 21/08* (2013.01); *F16L 25/12* (2013.01)

(58) Field of Classification Search
CPC ....... F16L 15/00; F16L 21/002; F16L 21/035; F16L 21/08; F16L 25/12
See application file for complete search history.

(56) References Cited

U.S. PATENT DOCUMENTS

| | | | | |
|---|---|---|---|---|
| 3,053,553 A | * | 9/1962 | Browning | ............... F16L 23/16 285/31 |
| 3,290,063 A | * | 12/1966 | Haeber | ................... F16L 25/00 285/302 |
| 4,749,214 A | * | 6/1988 | Hoskins | ............. F16L 37/0987 285/379 |

(Continued)

OTHER PUBLICATIONS

Mahmoud Sayed-Ahmed, Khaled Sennah, Structural behavior of UHPFRC-Filled, Transverse C-Joint In Full depth, GFRP-reinforced, precast bridge deck panels resting over steel girders, May 27, 2015.

(Continued)

*Primary Examiner* — James M Hewitt, II
(74) *Attorney, Agent, or Firm* — HIPP LAW

(57) ABSTRACT

Pipe connector for coupling a first-end pipe and a second-end pipe that includes intermediary attachment connectors for each of the first-end and second-end pipes. The attachment connectors include O-ring slots machined into an external perimeter surface and a movable sleeve that engages with the intermediary attachment connectors to form a seal between the O-ring slots and an internal perimeter surface of the sleeve.

17 Claims, 8 Drawing Sheets

(56) References Cited

U.S. PATENT DOCUMENTS

| | | | | |
|---|---|---|---|---|
| 7,077,436 | B1* | 7/2006 | Krywitsky | F16L 25/00 |
| | | | | 285/912 |
| 7,930,857 | B2 | 4/2011 | Pope | |
| 10,883,631 | B2* | 1/2021 | Mueller | F16L 21/08 |
| 2008/0066392 | A1 | 3/2008 | Sorensen | |
| 2014/0374122 | A1* | 12/2014 | Fanguy | E21B 17/043 |
| | | | | 166/380 |
| 2015/0030387 | A1 | 1/2015 | Poustchi | |
| 2018/0274704 | A1 | 9/2018 | Mueller | |

OTHER PUBLICATIONS

Notice of Allowance, "Notice of Allowance dated Apr. 4, 2020," U.S. Appl. No. 15/994,594, dated Apr. 4, 2020, 7 Pages.

Office Action, "Non-final Office Action dated Jun. 26, 2020," U.S. Appl. No. 15/994,594, dated Jun. 26, 2020, 15 pages.

Scott D. Porter; J. Logan Julander; Marvin W. Halling, F.Asce; Paul J. Barr, ; Hugh, Flexural Testing of Precast Bridge Deck Panel Connections, May 3, 2011.

\* cited by examiner

APPARATUS FOR CONNECTION AND SEALING OF UTILITY CONNECTIONS

CROSS-REFERENCES TO RELATED APPLICATIONS

This application is a continuation of U.S. application Ser. No. 15/994,545, entitled "APPARATUS FOR CONNECTION AND SEALING OF UTILITY CONNECTIONS," filed May 31, 2018, now U.S. Pat. No. 10,883,631, issued Jan. 5, 2021, and claims priority to U.S. Provisional Application No. 62/513,678 filed on Jun. 1, 2017 and entitled "NOVEL CONNECTION AND SEALING DEVICE FOR UTILITY CONNECTIONS BETWEEN CONCEALED WALLS AND/OR FLOORS," which the full disclosure of these applications is incorporated herein by reference for all purposes.

BACKGROUND

In days gone by, the notion of modular construction brought about images of trailer parks in the middle of the desert. In that early era of modular construction, mobile homes were crafted as a complete package. A mobile home was a self-contained structure that included all plumbing, electrical and heating and air-conditioning systems. Typically, the same building codes applied to mobile home construction, except for certain structural elements where weight would be prohibitive. Because the entire mobile home was completed in the factory, the factory could control how the internal mechanical systems were integrated and assembled.

Modernly, modular construction refers to systems that are prefabricated and shipped for assembly. These prefabricated building components are intended to last as long as, if not longer than their traditional construction counterparts. Prefabricated components are used to construct permanent edifices. From office buildings to single-family dwellings to apartment complexes, prefabricated components provide excellent structural integrity, mechanical reliability and reduced cost. Cost reduction, as might be imagined, is realized by economies of scale where prefabricated components are fabricated in a factory. Factories that produce prefabricated building components also aspire to greater quality in their finished goods. As such, many prefabricated building components are produced to high quality standards such as ISO-9000.

There is still a great deal of evolution that needs to take place in the prefabricated building component technical space. For example, prefabricated building components that include plumbing still require manual assembly and coupling of plumbing included in the prefabricated component to site-constructed elements or to other prefabricated components. In order to support such assembly, the industry has no choice but to provide cover plates so that the plumbing connections can be completed during final assembly and integration of prefabricated components.

Although the cover plates are effective at providing access to plumbing connections, the cover plates are essentially large and are required on both sides of a panel, for example in the case of a prefabricated wall component, so that conventional plumbing tools can be used to affect connection of plumbing in a prefabricated component to plumbing in site-constructed elements or to other prefabricated building components. Because of the size required to access and work upon plumbing fittings in prefabricated building components, these large cover plates become unsightly and deter from the otherwise clean-line appearance of prefabricated building components.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
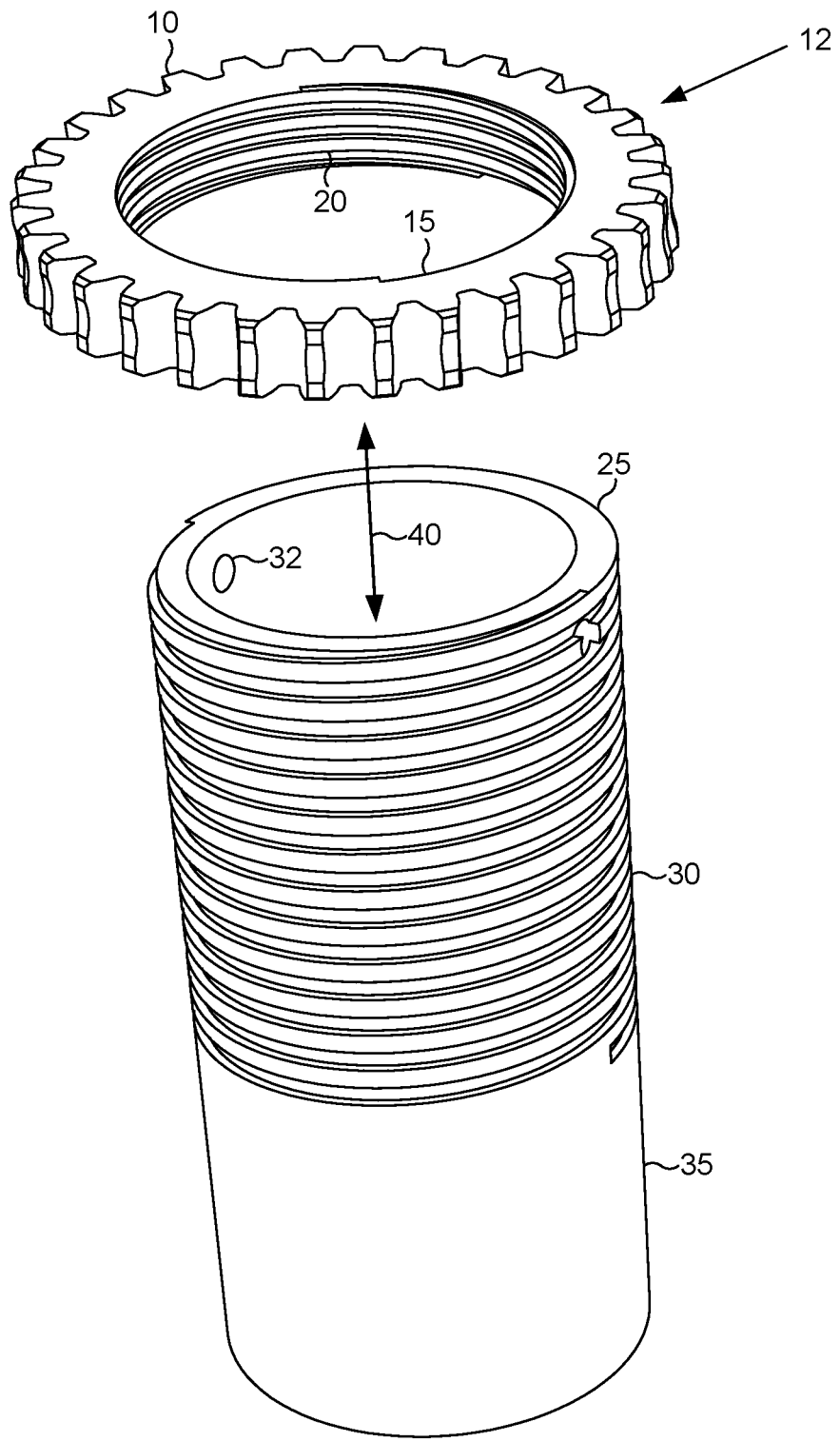
FIG. 1 is a perspective view of one example embodiment of a sleeve and one example embodiment of an axial transition gear, both of which are used as components in a first-end pipe connector of one example embodiment.

FIG. 1 is a perspective view of one example embodiment of a sleeve and one example embodiment of an axial transition gear, both of which are used as components in a first-end pipe connector of one example embodiment. According to one example embodiment, a first-end pipe connector comprises a sleeve 25 and an axial transition gear 12. The sleeve 25 of this alternative example embodiment includes an outer perimeter surface 35. A portion of the outer perimeter surface 35 includes a threaded region 30. It should be noted that the sleeve 25 defines an axial movement axis 40 which is coincident with center points of the sleeve, said center points occurring at either end of the sleeve.

In this example embodiment, the axial transition gear 12 includes an inner surface bounded by an inner perimeter 15. The inner surface 20 of this example embodiment includes a threaded feature 21. It should be appreciated that, according to this example embodiment of a first-end pipe connector, the threaded region 21 of the axial transition gear 12 corresponds with the threaded region 30 included on the outer surface 35 of the sleeve 25. Accordingly, when a first-end pipe connector of this embodiment is assembled, the axial transition gear 12 is fitted on to the sleeve 25.

As further illustrated in the figure, the axial transition gear 12 also includes a worm-wheel feature 10 around the outer perimeter of the axial transition gear 12. Once the axial transition gear 12 is fitted onto the sleeve 25, the sleeve 25 and axial transition gear 12 are then installed in a housing. It should be appreciated that the axial transition gear 12 is fitted onto the sleeve 25 by rotating the axial transition gear 12 about the axial movement axis 40 so as to engage the thread 21 included on the inner surface of the axial transition gear 12 with the thread region 30 included on the outer surface 35 of the sleeve 25.

Figure 2:
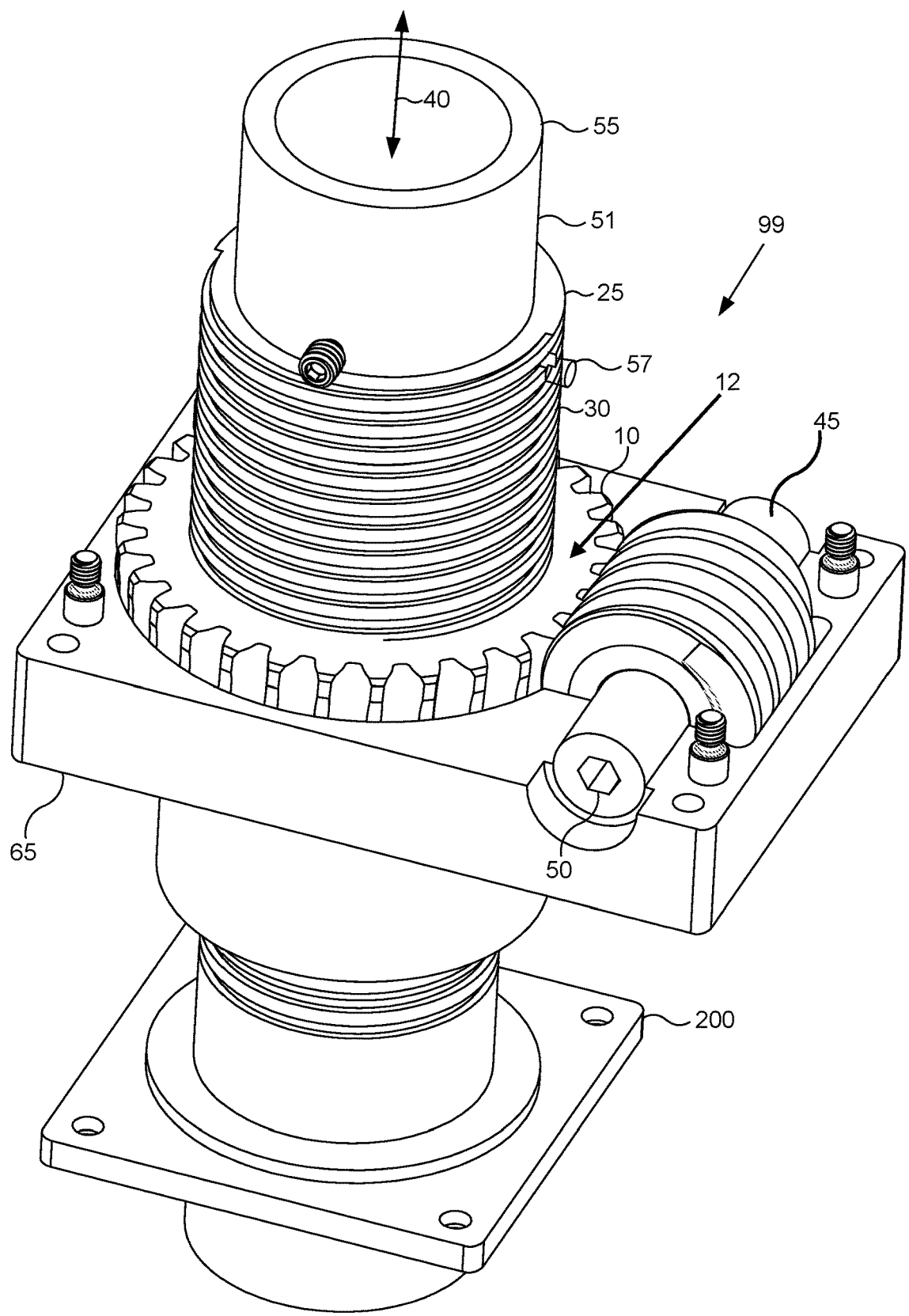
FIG. 2 is a perspective drawing that illustrates one example embodiment of a first-end pipe connector.
Figure 3:
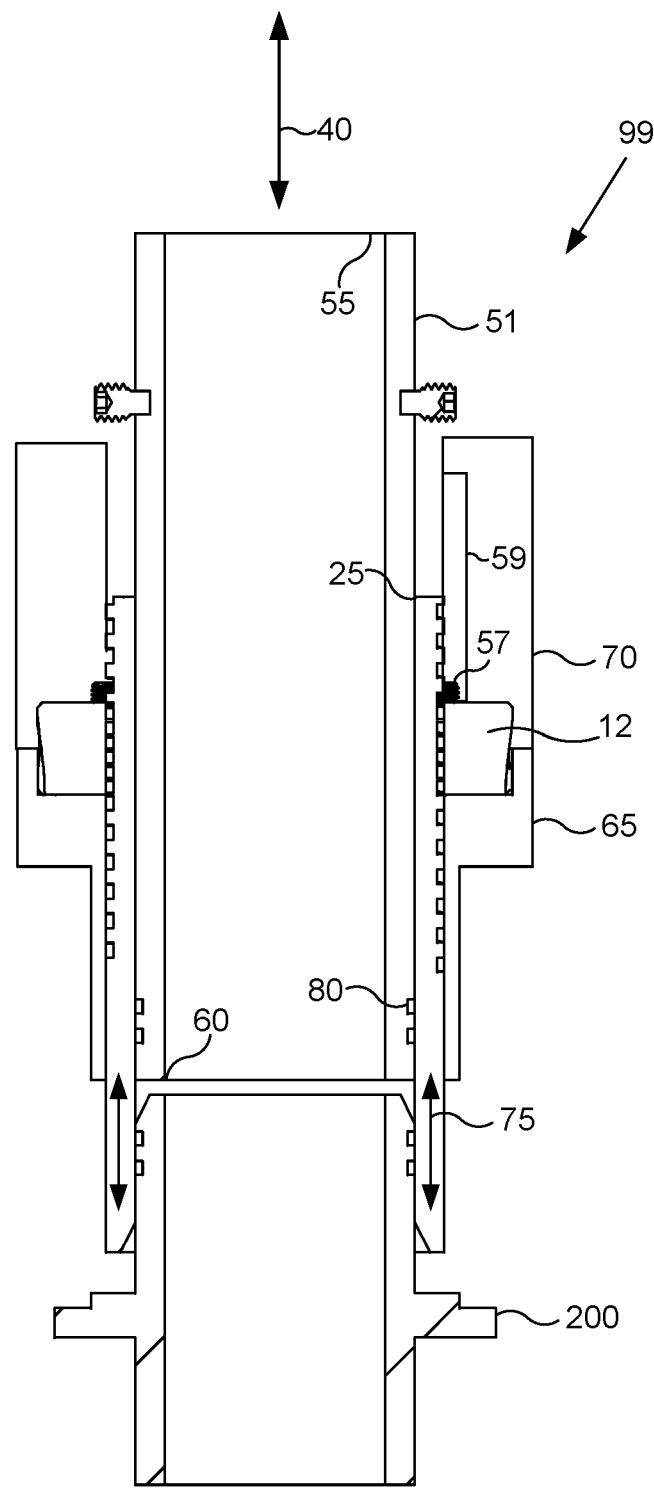
FIG. 3 is a cross-section diagram that depicts the operation of one example embodiment of a first-end pipe connector.

FIG. 2 is a perspective drawing that illustrates one example embodiment of a first-end pipe connector. According to this example embodiment, a first-end pipe connector 99 comprises a sleeve 25, an axial transition gear 12, a housing, which according to this alternative example embodiment comprises a lower portion 65 and an upper portion 70, as shown in FIG. 3, and a worm-gear 45.

Once the sleeve and axial transition gear are fitted into a first portion of a housing 65, the axial transition gear 12 is received into a substantially circular receptacle in the first portion of the housing 65. The housing of this example embodiment also includes a receptacle to receive a worm-gear 45. The worm-gear 45 is situated so as to engage with the worm-wheel feature 10 included in the axial transition gear 12. Once a second portion of the housing is installed, the axial transition gear 12 is substantially restrained from moving along the axial movement axis 40. It should be noted that this alternative example embodiment includes a restraint pin 57 that interacts with a second portion of the housing in order to substantially restrain the sleeve 25 from rotating about the axial movement axis 40.

Because the sleeve 25 is prevented from rotating about the axial movement axis 40, it moves up or down along the axial movement axis 40 as the axial transition gear 12 is rotated. It should be apparent that, as the axial transition gear 12 is rotated about the axial movement axis 40, engagement with the threaded portion 30 of the sleeve 25 causes the sleeve 25 to move up and down along the axial movement axis 40.

FIG. 2 further illustrates that the worm-gear 45 includes a rotational actuation feature 50. In one alternative example embodiment, the worm-gear 45 includes a recessed profile that accommodates a hex-wrench, which is then used to rotate the worm-gear 45. As the worm-gear 45 is rotated, it causes a corresponding rotation of the axial transition gear 12. As the axial transition gear 12 rotates, the threaded portion of its inner surface causes the sleeve 25 to move along the axial movement axis 40. As the sleeve 25 moves outward from the first portion of the housing 65, it engages with a second-end pipe connector 200, as further described below.

FIG. 3 is a cross-section diagram that depicts the operation of one example embodiment of a first-end pipe connector. According to this example embodiment, an assembled first-end pipe connector 99 also includes an upper portion of the housing 70.

The upper portion of the housing 70 includes a slot 59, which is disposed to engage with the restraint pin 57 installed in the sleeve 25. The restraint pin 57 moves along the slot 59 as the sleeve 25 moves 75 along the axial movement axis 40. It should apparent that such restraint may be placed anywhere that is convenient so long as the sleeve 25 is restrained from rotating about the vertical axis of movement.

According to one example embodiment, the first-end pipe connector further includes an attachment cylinder 51. The attachment cylinder 51 includes a pipe-coupling end 55 and a connector end 60. The pipe-coupling end 55 is used to attach to standard plumbing, for example such as that used in modular building components. The other and of the attachment cylinder is used to affect connection with a second-end pipe connector 200. In this alternative example embodiment, the attachment cylinder 51 includes an external surface that includes an O-ring slot 80. When fully assembled, an O-ring is installed in the O-ring slot 80. The fitted O-ring provides for a pressure seal between the attachment cylinder 51 and an internal surface of the sleeve 25.

Figure 4:
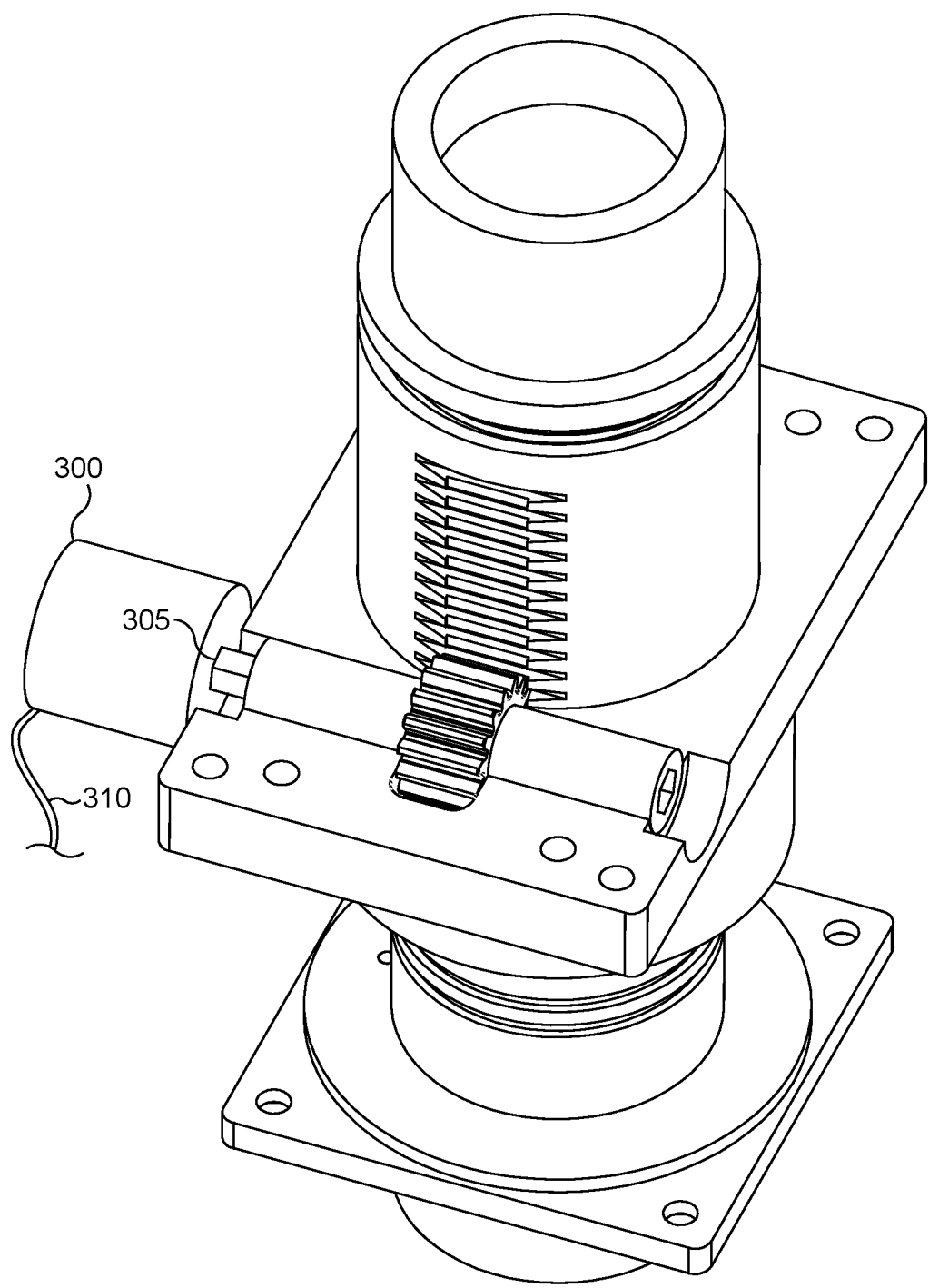
FIG. 4 is a perspective view that depicts installation of an actuator.

FIG. 4 is a perspective view that depicts installation of an actuator. According to various alternative example embodiments, a first-end pipe connector further includes an actuator 300. According to one alternative example embodiment, the actuator comprises an electric motor. In yet another alternative example embodiment, the actuator comprises a hydraulic motor. And in yet another alternative example embodiment, the actuator comprises a pneumatic motor. Irrespective of the type of actuator applied, all variations of these embodiments include an actuator that creates a rotational force. An actuator 300 receives power by way of a power connection 310. When power is applied to the actuator 300, the actuator 300 develops rotational force and applies the rotational force to an actuator rod 305. It should likewise be appreciated that power to the actuator 300, according to one alternative example embodiment, is applied with polarity so that application of power in one polarity causes the actuator to rotate in a clockwise direction while power in an alternative polarity causes the actuator to rotate in a counterclockwise direction.

It should be apparent that shifting polarity to an electric motor is accomplished by swapping positive and negative voltage to a direct current motor. Hydraulic motors require a secondary power path so that a working fluid, e.g. hydraulic oil, has a return path and the direction of fluid flow corresponds to the direction of actuator rotation. A pneumatic motor also requires a secondary power path, but the secondary power path is typically used to apply air pressure in order to achieve counter direction in rotation. It should be apparent to those skilled in the art that a pneumatic motor will typically simply expel low-pressure air to the ambient environment.

Figure 6:
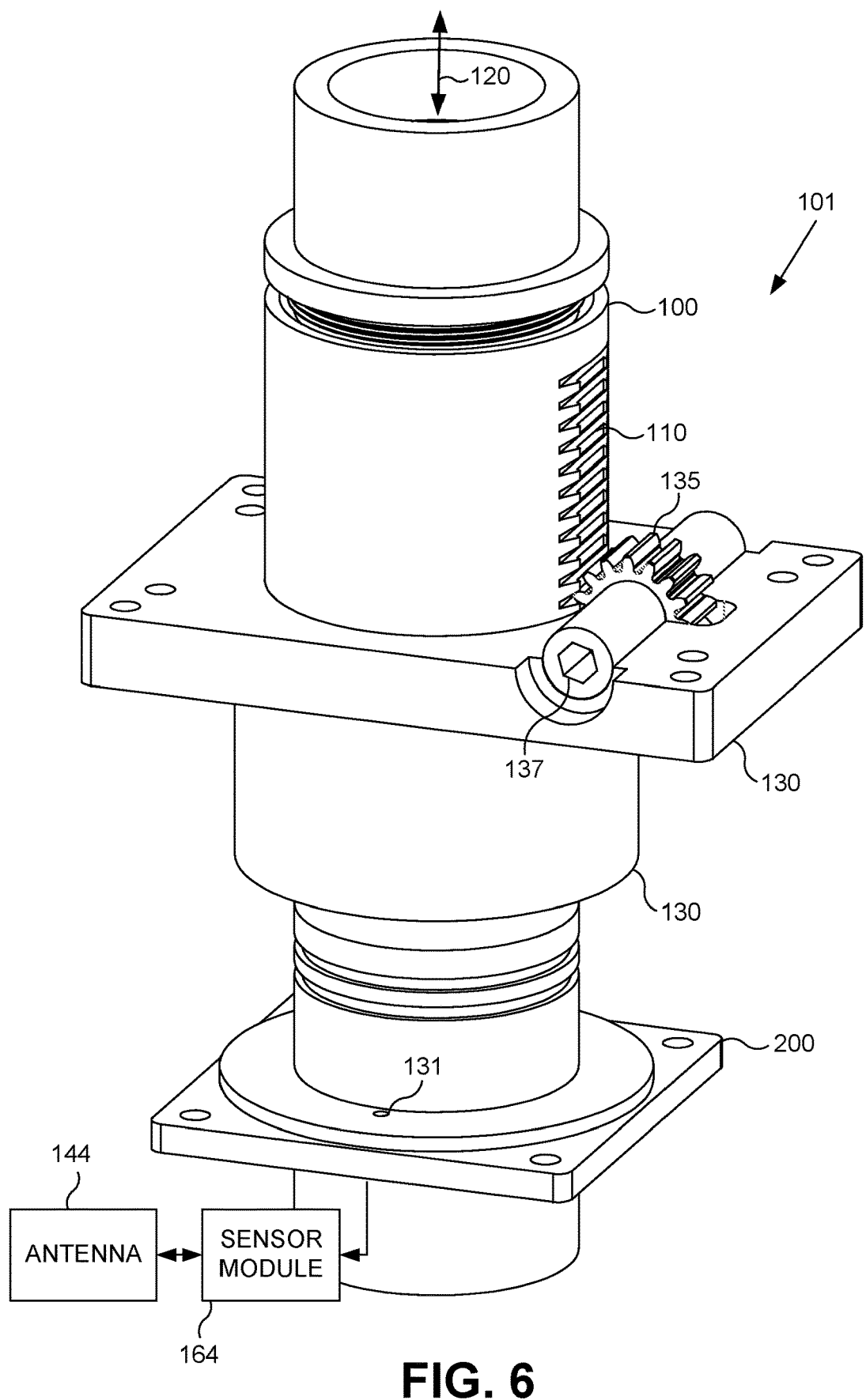
FIG. 6 is a perspective drawing that illustrates the internal structure of one alternative example embodiment of a first-end pipe connector.

It should be appreciated that the actuator herein described is utilized with either embodiment of a first-end pipe connector herein described. The actuator rod 305 couples with the rotational actuation feature 50 included in a worm-gear 45, which is used in a first embodiment of a first-end pipe connector. In the second embodiment herein described, the actuator rod 305 couples with the rotational actuation feature 137 included in a pinion gear 135, which is used in said second embodiment of a first-end pipe connector, as shown in FIG. 6. Accordingly, this actuator mechanism is intended to be a universal actuator for first-end pipe connectors of various embodiments as herein described and may be further contemplated by the description set forth herein.

Figure 5:
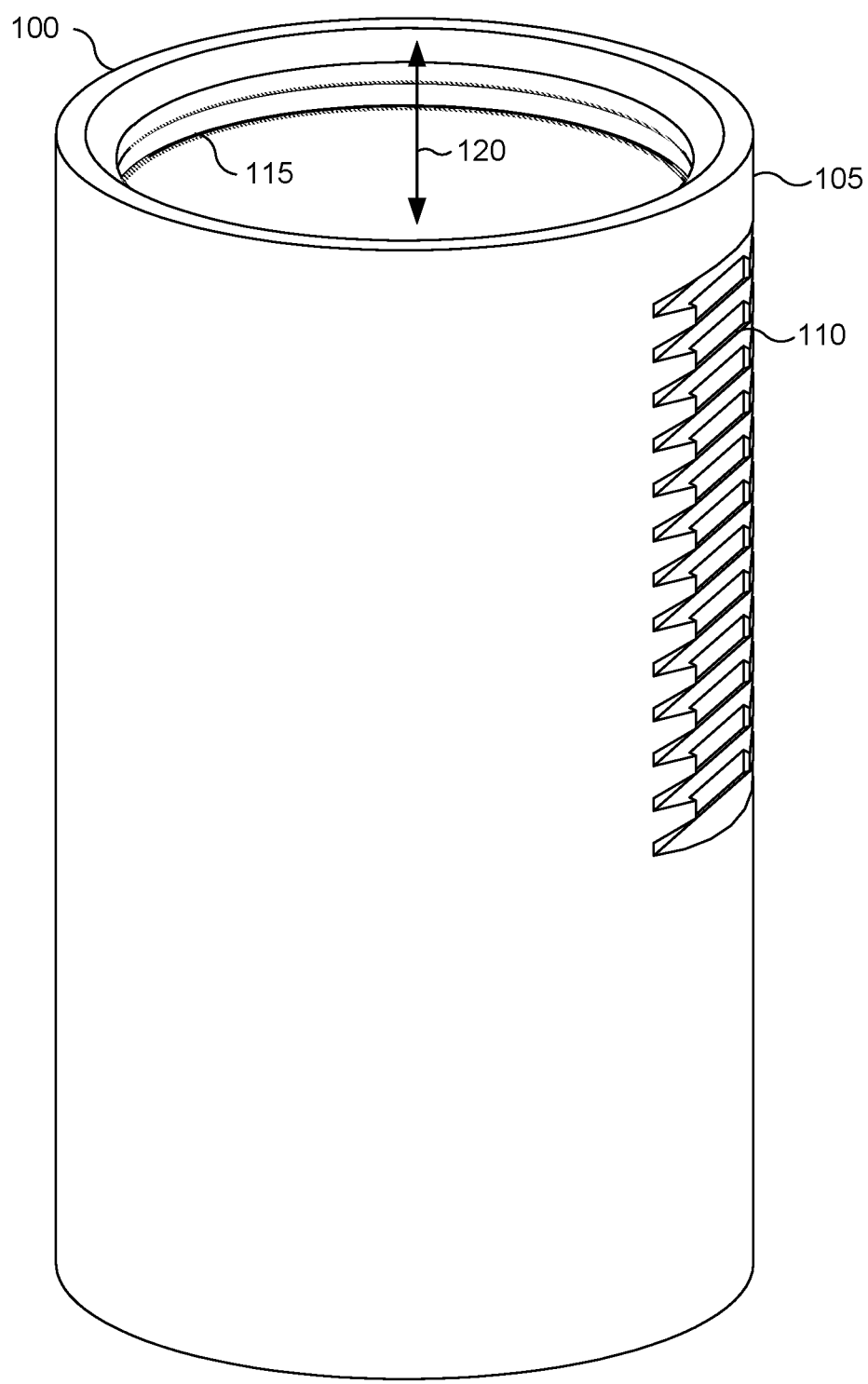
FIG. 5 is a perspective view of one alternative example embodiment of a sleeve included in a second embodiment of a first-end pipe connector.

FIG. 5 is a perspective view of one alternative example embodiment of a sleeve included in a second embodiment of a first-end pipe connector. According to this example embodiment, the sleeve 100 includes an axial movement gear-rack 110 disposed on an outer perimeter surface 105 included in the sleeve 100. It should be appreciated that, according to this example embodiment, the gear-rack 110 comprises gear features machined into the outer surface 105 of the sleeve 100. According to yet another alternative example embodiment, a gear-rack 110 comprises an independent element that is mechanically attached to the outer surface 105 of the sleeve 100.

According to yet another alternative example embodiment, the sleeve 100 further includes a detent receptacle 115, which, according to various alternative example embodiments, comprises a slot machined into an inner surface of the sleeve 100.

FIG. 6 is a perspective drawing that illustrates the internal structure of one alternative example embodiment of a first-end pipe connector. According to this alternative example embodiment, a first-end pipe connector comprises a sleeve 100, an axial movement gear-rack 110, a housing, and a pinion gear 135. It should be appreciated that, according to various illustrative embodiments, the housing includes a first housing portion 130 and a second housing portion (as illustrated in FIG. 7).

The pinion gear 135, during assembly of this alternative example embodiment of a first-end pipe connector, is engaged with the gear-rack 110 included in the sleeve 100. The sleeve 100, together with the pinion gear 135, are then inserted into the lower portion of the housing 130. Lower portion of the housing 130 includes an orifice that receives the sleeve 100 and also includes a feature to receive the pinion gear 135. It should be appreciated that the orifice that receives the sleeve 100 allows the sleeve 100 to emanate from a lower end of the housing 130. Accordingly, the pinion gear 135 includes a rotational actuation feature 137. The rotational actuation feature 137 of one alternative example embodiment comprises a recess configured to receive a hex-wrench for the purpose of rotating the pinion gear 135. When the second portion of the housing 140, as seen in FIG. 7, is installed, it secures the pinion gear 135 in position and substantially restrains it from moving along and axial movement axis 120.

It should be appreciated that, as illustrated in the figure, rotation of the pinion gear 135 causes the sleeve 100 to move along the axial movement axis 120. As a sleeve 100 emanates from the bottom of the lower portion of the housing 130 engages with a second-end pipe connector 200, as discussed below.

Figure 7:
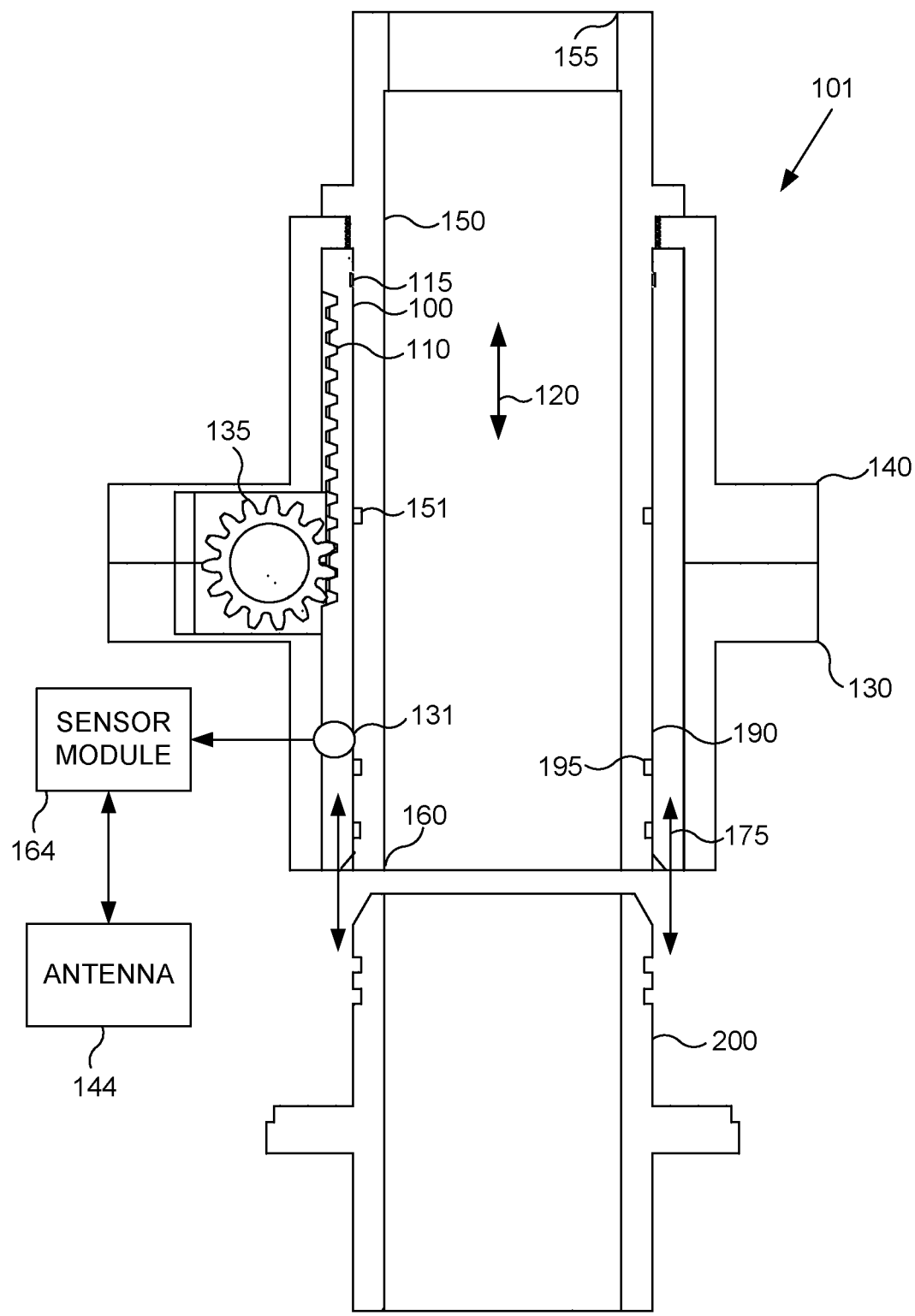
FIG. 7 is a cross-section view that depicts the internal operation of a second embodiment of a first-end pipe connector.

FIG. 7 is a cross-section view that depicts the internal operation of a second embodiment of a first-end pipe connector. As heretofore described, the pinion gear 135 is substantially restrained from moving along the axial movement axis 120. Such restraint is provided by a "clam-shell" feature formed by the upper portion of the housing 140 and the lower portion of the housing 130. As the pinion gear 135 is rotated, the rotating pinion imparts horizontal movement upon the gear-rack 110. As a consequence, the sleeve 100 moves vertically 175 along the axial movement axis 120.

As in the first described embodiment, this example alternative embodiment of a first-end pipe connector, according to yet another alternative embodiment, further includes an attachment cylinder 150. The attachment cylinder 150 includes an external perimeter surface 190. According to this alternative example embodiment, the attachment cylinder 150 further includes an O-ring slot 195 disposed on its external perimeter surface 190.

As the sleeve 100 moves downward toward a second-end pipe connector, it will engage with one or more O-rings included on an external perimeter surface of said second-end pipe connector 200. It should be appreciated that O-rings installed in the O-ring slot 195 included in the external surface 190 of the attachment cylinder 150 and in an O-ring slot provided on the second-end pipe connector 200 forms a seal thereby affecting coupling between a first pipe and a second pipe wherein the first pipe is attached to the attachment cylinder 150 and the second pipe is attached to an attachment cylinder included in a second-end pipe connector as described below.

As heretofore described, the sleeve of this alternative example embodiment of a first-end pipe connector 101 includes a detent receptacle 115. The attachment cylinder 150 of this alternative embodiment of a first-end pipe connector 101 includes a corresponding detent receptacle 151. During assembly, a detent device is installed in the detent receptacle 151 included in the external perimeter surface of the attachments cylinder 150. As the sleeve 100 moves downward, the detent receptacle 115 included therein will align with the detent receptacle 151 included in the attachment cylinder 150, thereby locking the sleeve 100 in the detent position. According to various alternative embodiments, the detent device includes any appropriate malleable material that will substantially restrain movement of the sleeve 100 along the axial movement axis 120.

Figure 8:
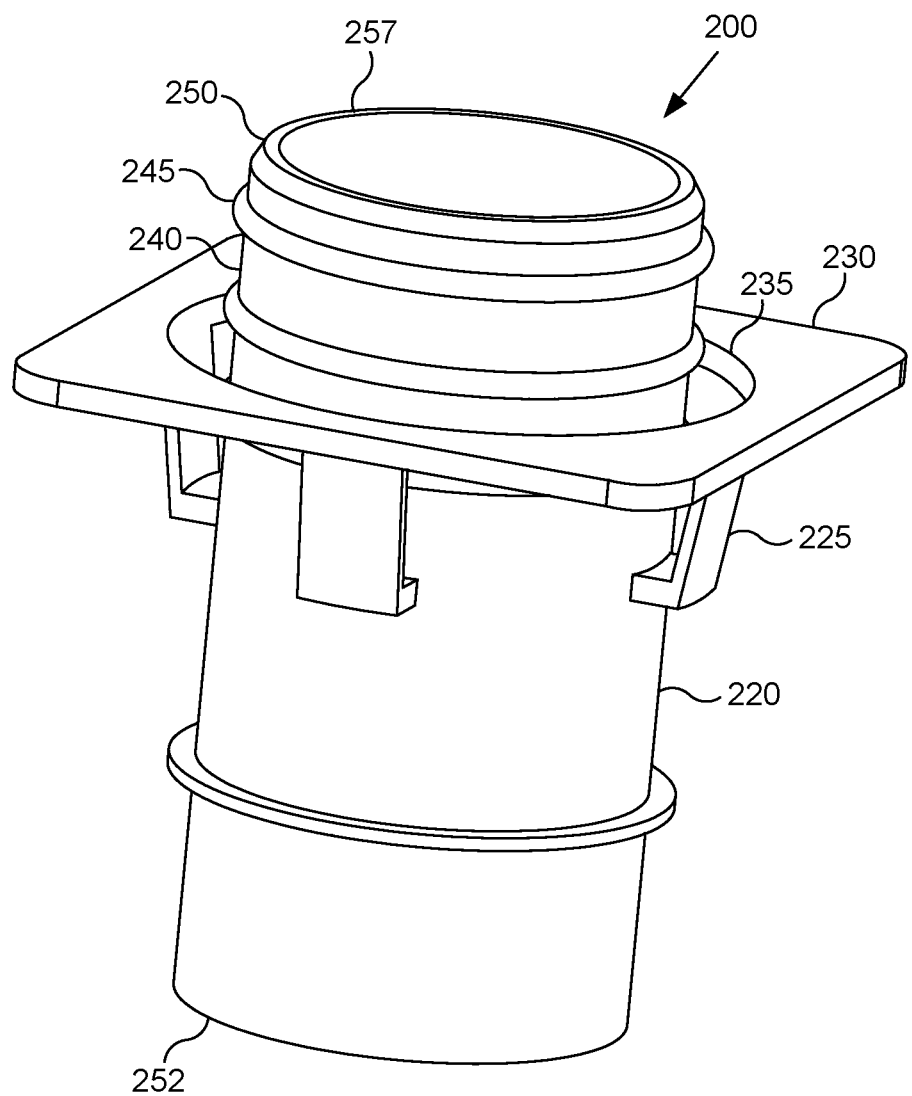
FIG. 8 is a perspective view of various alternative example embodiments of a second-end pipe connector.

FIG. 8 is a perspective view of various alternative example embodiments of a second-end pipe connector. According to one example embodiment, a second-end pipe connector 200 comprises an attachment cylinder 250. According to this example embodiment, the attachment cylinder 250 includes a pipe-coupling 252 and a connector end 257. The attachment cylinder 250 includes an external perimeter surface 240. The connector end 257 is fashioned in order to engage with an internal perimeter of a sleeve, which is typically included in a first-end pipe connector. Also, the attachment cylinder 250 includes one or more O-ring slots disposed on the external perimeter surface 240 proximate to the connector end 257 of the attachment cylinder 250.

FIG. 8 also illustrates that, according to one alternative example embodiment of a second-end pipe connector, such second-end pipe connector further includes a mounting flange 230. According to this alternative example embodiment, the mounting flanged 230 includes an orifice 235. When assembled, the attachment cylinder 250 is disposed in the orifice, accordingly said orifice is configured to accept the attachment cylinder. In this alternative example embodiment, a plurality of spring-restraints 225 are included in the second-end pipe connector. The spring-restraints 225 emanate from the mounting flange 230, protruding away from the flange 230 at an angle away from a planar coincident with the flange toward the center of the orifice. It should be appreciated that, according to this alternative example embodiment, the spring-restraints 225 are of sufficient length to contact the attachment cylinder 250.

In this alternative example embodiment, the spring-restraints 225 are attached to the attachment cylinder 250. By attaching the spring-restraints 225, the spring-restraints substantially prevent the attachment cylinder 250 from moving vertically relative to the plane or coincident with the mounting flange 230. Likewise, the spring action of the spring-restraints 225 allows the attachment cylinder 250 to move horizontally relative to the planar that is coincident with the mounting flange 230. Accordingly, a small amount of horizontal deviation is accommodated when the mounting flanged 230 is attached to a building component.

This horizontal deviation is important when the second-end pipe connector is engaged with a first-end pipe connector as heretofore described. Hence when such engagement is affected, shifting of one building component relative to the a second building component is accommodated by the horizontal deviation provided by the spring-restraints 225 and prevents failure of a coupling seal established between a first-end pipe connector and a second-end pipe connector by way of the sleeve engaging with the attachment cylinder of a first-end pipe connector and the attachment cylinder of a second-end pipe connector. It should be appreciated that shifting of one building component relative to a second building component is often associated with an earthquake event.

FIG. 6 further illustrates that, according to one alternative example embodiment, the second-end pipe connector further includes a sensor 131 disposed to detect when the sleeve 100 is fully engaged with said second-end pipe connector. The sensor 131 is electrically coupled to an included sensor module 164 that includes a circuit for sensing the state of the sensor 131. The circuit operates from power received by means of an antenna 144, which is also electrically coupled to the sensor module 164. The antenna is also included in one alternative embodiment of the second-end pipe connector 200. FIG. 7 shows that this same arrangement, according to one alternative embodiment, is included in a first-end pipe connector (99, 101).

In operation, the antenna 144 receives radio-frequency energy and directs the energy to the sensor module 164 where it is used to power a circuit. The circuit, as it operates, senses the state of the sensor and generates an RF signal according to the state of the sensor.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A pipe connector system, comprising:
a first-end pipe connector operable to couple to a first pipe, wherein the first-end pipe connector includes:
 a sleeve including an outer perimeter surface and an inner perimeter surface, the sleeve defining an axial movement axis coincident with a centerline of the sleeve,
 a first attachment cylinder including a first connector end, the first connector end configured to engage the inner perimeter surface of the sleeve,
 an axial movement gear rack disposed along the outer perimeter surface of the sleeve and substantially oriented along the axial movement axis,
 a housing to contain the sleeve, the housing configured to allow the sleeve to move axially outward from the housing, and
 a gear component contained in the housing and engaged with the axial movement gear rack; and
a second-end pipe connector, the second-end pipe connector including:
 a second attachment cylinder having a second outer perimeter surface, the second attachment cylinder including a second connector end and a second pipe coupling end, wherein a first portion of the second outer perimeter surface including the second connector end is fashioned to engage with an internal perimeter of the sleeve, and wherein a second portion of the second outer perimeter surface including the second pipe coupling end operable to engage with a second pipe, and
 a mounting flange including an orifice for accepting the second attachment cylinder, and a plurality of connection points for securing the second-end pipe connector to a surface.

2. The pipe connector system of claim 1, wherein the gear component includes a rotational actuation feature.

3. The pipe connector system of claim 1, wherein the housing substantially retrains the gear component from moving along the axial movement axis.

4. The pipe connector system of claim 1, wherein the first connector end is disposed in the sleeve and includes an O-ring slot machined into the outer perimeter surface of the first attachment cylinder.

5. The pipe connector system of claim 1, further comprising:
a detent-stop disposed to substantially restrain movement of the sleeve when the sleeve is in a position engaging the first connector end of the first attachment cylinder.

6. The pipe connector system of claim 1, further comprising:
a position sensor disposed to detect when the sleeve is at a terminal position.

7. The pipe connector system of claim 1, further comprising:
a sensor module that receives power from an antenna, uses the power to operate a circuit, said circuit capable of detecting a sensor status signal and conveying a sensor state to a receiver by generating a radio signal and directing said radio signal to the antenna.

8. The pipe connector system of claim 1, wherein the mounting flange comprises a plurality of spring-restraints protruding at an angle away from a planar coincident with the mounting flange toward a center of the orifice, the plurality of spring-restraints having sufficient length to attach to the second attachment cylinder.

9. The pipe connector system of claim 8, wherein the plurality of spring-restraints substantially prevents the second attachment cylinder from moving vertically relative to the planar coincident with the mounting flange.

10. The pipe connector system of claim 8, wherein the plurality of spring-restraints allows the second attachment cylinder to move horizontally relative to the planar coincident with the mounting flange.

11. A pipe connector system, comprising:
a first-end pipe connector operable to couple to a first pipe, wherein the first-end pipe connector includes:
 a sleeve including an outer perimeter surface, the sleeve defining an axial movement axis coincident with a centerline of the sleeve,
 a first attachment cylinder including a first connector end and an outer perimeter surface, wherein the first connector end is disposed in the sleeve, and wherein the first connector end includes an O-ring slot machined into the outer perimeter surface;
 an axial movement gear rack disposed along the outer perimeter surface of the sleeve and substantially oriented along the axial movement axis,
 a housing to contain the sleeve, the housing configured to allow the sleeve to move axially outward form the housing,
 a pinion gear contained in the housing and engaged with the axial movement gear rack, wherein the pinion gear includes a rotational actuation feature, and wherein the housing substantially restrains the pinion gear from moving along the axial movement axis, and
 a position sensor disposed to detect when the sleeve is at a terminal position; and
a second-end pipe connector, the second-end pipe connector including:
 a second attachment cylinder having a second outer perimeter surface, the second attachment cylinder including a second connector end and a second pipe coupling end, wherein a first portion of the second outer perimeter surface including the second connector end is fashioned to engage with an internal perimeter of the sleeve, and wherein a second portion of the second outer perimeter surface includes the second pipe coupling end operable to engage with a second pipe, and a float-bracket that includes a mounting flange, the mounting flange including an orifice for accepting the second attachment cylinder and a plurality of spring-restraints protruding at an angle away from a planar coincident with the mounting flange toward a center of the orifice, the plurality of spring-restraints having sufficient length to attach to the second attachment cylinder.

12. The pipe connector system of claim 11, further comprising:
a sensor module that receives power from an antenna, uses the power to operate a circuit, said circuit capable of detecting a sensor status signal and conveying a sensor state to a receiver by generating a radio signal and directing said radio signal to the antenna.

13. The pipe connector system of claim 11, wherein the mounting flange comprises a plurality of spring-restraints protruding at an angle away from a planar coincident with the mounting flange toward a center of the orifice, the plurality of spring-restraints having sufficient length to attach to the second attachment cylinder.

14. The pipe connector system of claim 13, wherein the plurality of spring-restraints substantially prevents the second attachment cylinder from moving vertically relative to the planar coincident with the mounting flange.

15. The pipe connector system of claim 13, wherein the plurality of spring-restraints allows the second attachment cylinder to move horizontally relative to the planar coincident with the mounting flange.

16. A pipe connector system, comprising:
a first-end pipe connector operable to couple to a first pipe, wherein the first-end pipe connector includes:
a sleeve including an outer perimeter surface and an inner perimeter surface, the sleeve defining an axial movement axis coincident with a centerline of the sleeve,
an attachment cylinder including a first connector end, the first connector end configured to engage the inner perimeter surface,
an axial movement gear rack disposed along the outer perimeter surface of the sleeve and substantially oriented along the axial movement axis,
a housing to contain the sleeve, the housing configured to allow the sleeve to move axially outward from the housing, and
a gear component contained in the housing and engaged with the axial movement gear rack; and
a second-end pipe connector operable to connect to a second pipe, the second-end pipe connector including:
a second attachment cylinder having a second outer perimeter surface, the second attachment cylinder including a second connector end and a second pipe coupling end, wherein a first portion of the second outer perimeter surface including the second connector end is fashioned to engage with an internal perimeter surface of the sleeve, and wherein a second portion of the second outer perimeter surface includes the second pipe coupling end operable to engage with the second pipe, and
a mounting flange including an orifice for accepting the second attachment cylinder, and a plurality of connection points for securing the second-end pipe connector to a surface.

17. The pipe connector system of claim 16, further comprising:
a position sensor disposed to detect when the sleeve is at a terminal position; and
a sensor module that receives power from an antenna, uses the power to operate a circuit, said circuit capable of detecting a sensor status signal and conveying a sensor state to a receiver by generating a radio signal and directing said radio signal to the antenna.

* * * * *